Figure 1:
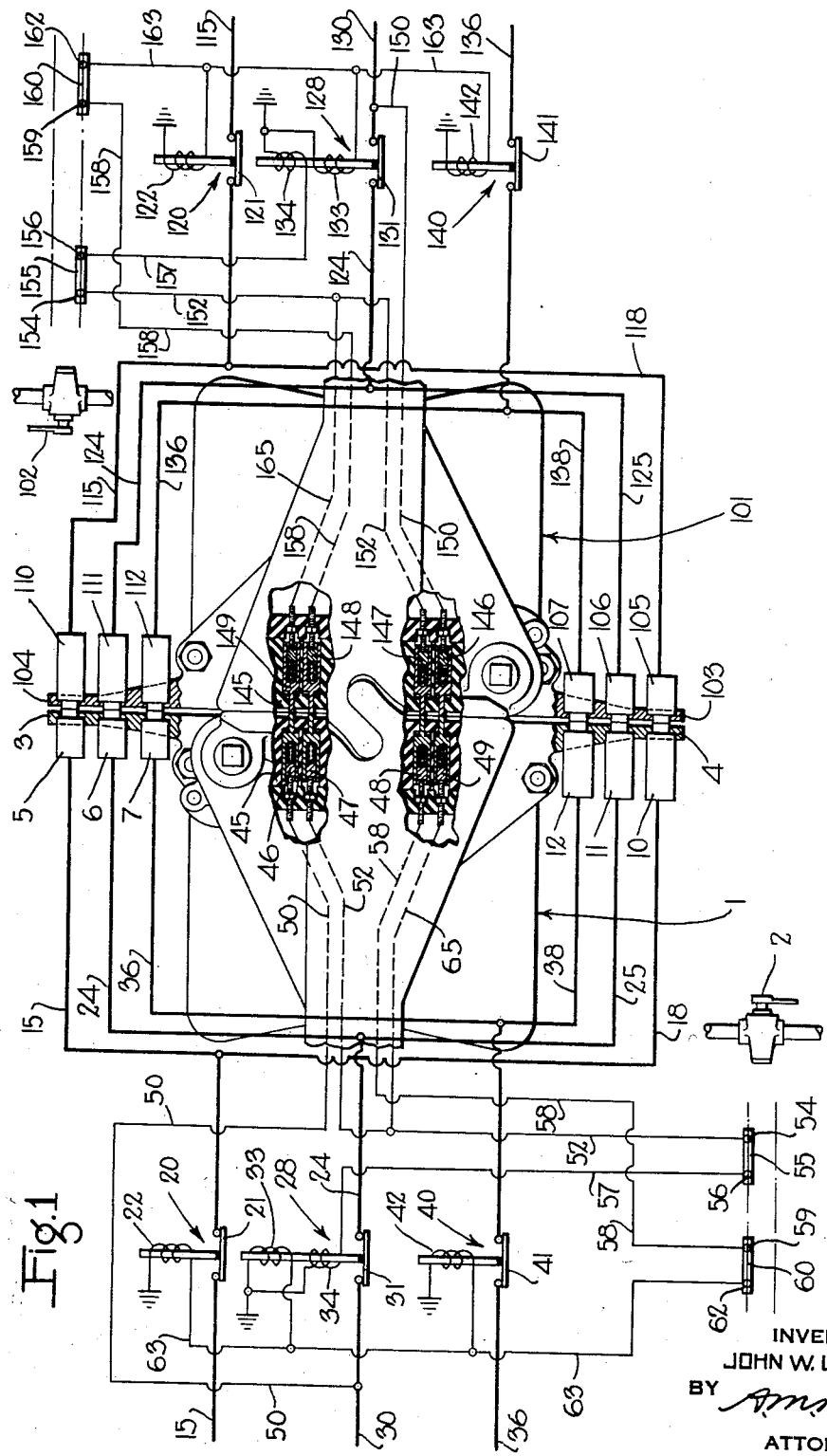

June 20, 1939. J. W. LOGAN, JR 2,163,400
CONTROL SYSTEM FOR TRAIN CIRCUITS
Filed March 9, 1937 2 Sheets-Sheet 1

INVENTOR
JOHN W. LOGAN, JR.
BY
ATTORNEY

INVENTOR
JOHN W. LOGAN, JR.
BY A. M. Higgins
ATTORNEY

Patented June 20, 1939

2,163,400

UNITED STATES PATENT OFFICE 2,163,400

CONTROL SYSTEM FOR TRAIN CIRCUITS

John W. Logan, Jr., Forest Hills, Pa., assignor to The Westinghouse Air Brake Company, Wilmerding, Pa., a corporation of Pennsylvania Application March 9, 1937, Serial No. 129,824

14 Claims. (Cl. 171—313)

This invention relates to a car coupling system and particularly to means to control the circuits through contacts associated with the car couplers.

The vehicle equipment of some electric railway systems includes motor or power cars which are provided with driving motors and have current collecting means, such as a trolley or a shoe adapted to engage a trolley wire or a third rail for collecting current from a source of supply.

The vehicle equipment of these railways also includes trailer or auxiliary cars which are not provided with driving motors or current collecting means, but are intended to be drawn by the motor cars. The trailer or auxiliary cars are provided with electric lights and electrical heating means which must be supplied with current from the motor or power cars.

These cars also have mounted thereon conductors which, when the cars are coupled into a train, form circuits extending throughout the train for the multiple unit control of the driving motors and air compressors on the motor cars.

These trains operate mostly in territory with low voltage contact system, but at times they operate in territory with high voltage contact system. The lighting and control circuits being designed for low voltage operation, it is necessary to use dynamotors to reduce the voltage for these services in high voltage territory. Each motor car is equipped with one such dynamotor which is of such size that it can supply all the train lighting or all the control power, but is not of capacity sufficient to supply both. Accordingly, a low voltage control power bus extends throughout the train and is supplied with current from the dynamotor on a motor car at one end of the train, while a low voltage lighting bus likewise extends throughout the train and is supplied with current from the dynamotor on a motor car at the opposite end of the train.

It is desired to have these circuits established by means of contacts associated with the car couplers and arranged so that the circuits will be established automatically when the cars are coupled together without special attention on the part of the trainmen.

Some cars of the type referred to above are equipped with automatic couplers having electric portions containing movable contacts which are adapted to engage only when the couplers are substantially fully coupled together to establish the individual circuits employed in the multiple unit control of the driving motors and air compressors. The contacts in these electric portions are retracted and are covered by doors when the cars are uncoupled, so that there is no hazard to trainmen or workmen if the contacts remain energized.

Because of the amount of current carried by the lighting supply bus, the control supply bus, and the heater connection between each trailer car and its associated motor car, it is not desired to carry these three circuits through the aforesaid electric portions of the couplers, but to establish them through other contacts carried by the coupler and not protected by a cover or door when the cars are separated.

As the contacts through which these circuits are established are exposed when the couplers are not coupled to other couplers, it is desirable that the contacts be deenergized at this time to prevent injury to trainmen or others who might touch them.

In addition, as these contacts carry relatively heavy currents at relatively high voltages, it is desirable that the contacts remain deenergized until the couplers are fully engaged when the couplers are being coupled, and that the circuits through the contacts be interrupted before the couplers are released in uncoupling in order to prevent arcing and damage to the contacts. It is desirable that this control of these circuits be automatic and result from operation of the couplers so as not to require special attention from the trainmen.

The circuits through the contacts associated with the couplers are controlled by magnetic contactors which are supplied with current from the control supply bus. As the cars are coupled into different combinations at different times the control supply bus wire on a car may be supplied with current from one end of the car at one time, and from the other end at another time, and it is necessary that the control of these contactors be arranged so that they will operate to complete the circuits controlled thereby regardless of the point at which current is supplied to the control supply bus.

It is an object of this invention to provide a car coupling system which fulfills the requirements outlined above.

A further object of the invention is to provide a car coupling system of the type described, and which necessitates a minimum of alteration in the standard couplers now produced for this class of service.

Another object of the invention is to provide an improved car coupling and circuit control system.

Figure 2:
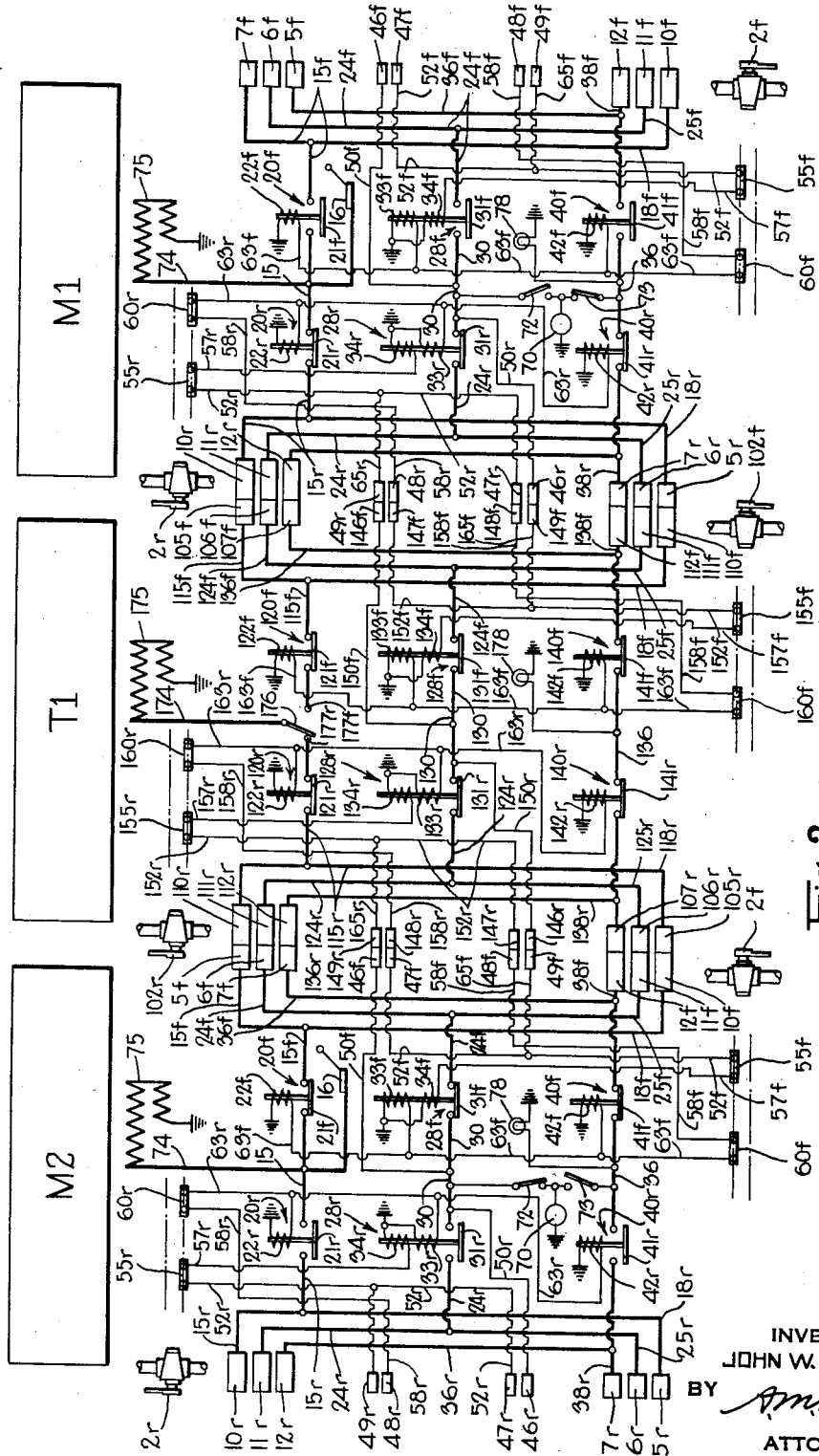

Other objects of the invention and features of novelty will be apparent from the following description taken in connection with the accompanying drawings, in which Fig. 1 is a diagrammatic view, partly in section, of a pair of couplers and associated apparatus embodying this invention, and Fig. 2 is a diagram of the circuit connections in a train of cars equipped with the coupling and control means provided by this invention.

Referring to Figure 1 of the drawings, there is illustrated therein a pair of couplers having associated therewith contacts and circuit control means embodying this invention. The equipment shown in this figure of the drawings includes a coupler and the associated apparatus for a motor or power car, and a coupler and the associated apparatus for a trailer or auxiliary car. The equipment for these cars is substantially identical, and the couplers are counterpart couplers, and any two couplers may be coupled together whether they are a coupler for a motor car and an auxiliary car, as shown in the drawings, or are two couplers for motor cars, or two couplers for trailer cars.

The equipment shown in Figure 1 of the drawings comprises a coupler indicated generally by the reference numeral 1 for a motor car, and a coupler indicated generally by the reference numeral 101 for a trailer car. These couplers are of the type shown in U. S. Patent No. 1,571,222, to H. F. Woernley, and each of these couplers has an electric portion incorporating a contact carrying slide which is retracted when the coupler is not coupled to another coupler, while a spring is provided for projecting the slide outwardly. A latch or trigger prevents movement of the slide by the spring until the couplers are fully engaged, at which time fluid under pressure is supplied to chambers at the faces of trigger release pistons in each of the couplers, which thereupon release the triggers and permit the springs to move the contact carrying slides outwardly into engagement with each other.

These couplers also have mechanism incorporated therein and operated on a supply of fluid under pressure to retract the contact carrying slides and to thereafter release the couplers and permit the cars to be separated, while the supply of fluid under pressure to the chambers at the faces of the trigger release pistons is cut off and fluid is released therefrom when the couplers are separated so that the triggers are permitted to maintain the contact carrying slides in their retracted positions.

The couplers have associated therewith manually operated uncoupling valve devices 2 and 102 for supplying fluid under pressure to the slide retracting mechanism and to the coupler releasing mechanism, while the couplers are constructed so that on the supply of fluid under pressure by the uncoupling valve device associated with either coupler, fluid flows to the connected coupler to operate the mechanism incorporated therein.

The couplers 1 and 101 differ from the couplers shown in the above identified U. S. Patent No. 1,571,222, to H. F. Woernley, in that the bodies of the couplers have brackets formed thereon which carry contacts which are adapted to engage cooperating contacts on a connected coupler. These brackets extend from each side of the coupler and each bracket carries three contacts.

The bracket 3 on one side of the coupler 1 carries contacts 5, 6 and 7, which are the stationary type, while the bracket 4 on the other side of the coupler 1 carries contacts 10, 11 and 12, which are the movable type.

The bracket 103 on one side of the coupler 101 carries contacts 105, 106, and 107, which are of the stationary type and are adapted to engage the movable contacts 10, 11 and 12 on the coupler 101 when the couplers are coupled together. The bracket 104 on the other side of the coupler 101 carries contacts 110, 111 and 112, which are of the movable type, and are adapted to engage the stationary contacts 5, 6 and 7 on the coupler 1.

The contacts on the couplers are of similar construction, the contacts of the stationary type having fixed contacts which are adapted to be engaged by spring pressed contact elements incorporated in the contacts of the movable type. The construction of these contacts forms no part of the present invention and one form of fixed and movable contacts which I may employ are illustrated and described in detail in the application of Roy R. Stevens, Serial No. 122,399, filed January 26, 1937.

The heater bus wire 15 leading from the stationary contact 5 of the coupler 1 is connected to current collecting means, such as the trolley indicated at 16, as shown in Figure 2 of the drawings, while the wire 15 is connected by way of a branch wire 18 with the movable contact 10. A magnetic contactor 20 having a movable contact 21 and a winding 22 is interposed in the wire 15 to control the supply of current from the current collecting means 16 to the contacts 5 and 10.

The contact 6 on the coupler 1 has connected thereto a wire 24, while this wire is connected by a branch wire 25 to the movable contact 11. An electroresponsive contactor indicated generally by the reference numeral 28 is provided to control connection of the wire 24 with the portion of the control supply bus wire 30 on the car on which the coupler 1 is mounted.

The contactor 28 has a movable contact 31, and, in addition, has windings 33 and 34, each of which has one terminal grounded, and either of which is operative upon energization to move the movable contact 31 to the closed position. The windings are so connected that they assist, rather than oppose, each other when energized concurrently.

The stationary contact 7 has the light supply bus wire 36 connected thereto, while this wire is connected by way of a branch wire 38 with the movable contact 12. A magnetic contactor indicated generally by the reference numeral 40 is interposed in the wire 36 to control the circuit therethrough. The contactor 40 has a movable contact 41 and a winding 42 which is operable upon energization to move the contact 41 to the closed position.

The equipment associated with the coupler 101 is similar to that associated with the coupler 1. The movable contact 110 has a wire 115 leading therefrom to current consuming means, in this case an electrical heating unit indicated at 175 in Fig. 2, while this wire is connected by way of a branch wire 118 with the stationary contact 105. A contactor indicated generally at 120 is provided for controlling the circuit through the wire 115. The contactor 120 has a movable contact 121 and a winding 122.

The movable contact 111 has a wire 124 connected thereto, and this wire is connected by way of a branch wire 125 with the stationary contact 106.

The wire 124 is connected to one terminal of an electroresponsive contactor indicated generally by the reference numeral 128. The contactor 128 has a movable contact 131 which controls the circuit between the wire 124 and the portion of the control supply bus wire 130 on the car on which the coupler 101 is mounted. The contactor 128 has windings 133 and 134 each of which has one terminal connected to ground, and either of which is operative upon energization to move the movable contact 131 to the closed position.

The movable contact 112 has the light supply bus wire 136 connected thereto, while the light supply bus wire 136 is connected by way of a branch wire 138 to the stationary contact 107. A contactor indicated generally by the reference numeral 140 is interposed in the light supply bus wire 136 to control the circuit therethrough. The contactor 140 has a movable contact 141 and a winding 142.

The electric portion of the coupler 1 comprises a contact carrying slide 45 which may be formed of a suitable non-conducting material. The slide 45 has a number of bores therein in which are mounted contact elements 46, 47, 48 and 49 employed in the control system provided by this invention, as well as other contact elements, not shown, which are employed in the control of the driving motors on the motor cars.

The contact elements are of similar construction and have spring pressed movable members which project from the face of the contact carrying slide, and are adapted to engage similar contact elements on the contact carrying slides of a connected coupler when the contact carrying slides are projected toward each other.

The electric portion of the coupler 101 is similar to that of the coupler 1 and has a contact carrying slide 145 having associated therewith contact elements 146, 147, 148 and 149.

The contact elements on each of the contact carrying slides are arranged in groups on each side of the plane of the center line of the coupler, each group being spaced an equal distance from this plane so that when two couplers are connected together the proper contact elements are brought into alignment with each other. The contact elements 46 and 47 on the coupler 1 are arranged at one side of the plane of the center line of the coupler and are adapted to engage contacts 149 and 148, respectively, on the coupler 101, while the contact elements 48 and 49 on the coupler 1 are positioned at the opposite side of the plane of the center line of the coupler, and are adapted to engage contact elements 147 and 146, respectively, on the coupler 101.

The contact element 46 is connected by way of a wire 50 to the portion of the control supply bus 30 on the car on which the coupler 1 is mounted.

The contact element 47 is connected by way of a wire 52 with a stationary contact indicated at 54, which is adapted to be engaged by a movable contact 55 associated with the uncoupling valve device 2 for the coupler 1. The movable contact 55 is also adapted to engage a stationary contact 56 which is connected by way of a wire 57 with one terminal of the winding 34 of the electroresponsive contactor 28.

The contact element 48 is connected by way of a wire 58 with a stationary contact 59 which is adapted to be engaged by a movable contact 60 associated with the uncoupling valve device 2 for the coupler 1. The movable contact 60 is also adapted to engage a stationary contact 62 which is connected by way of a wire 63 with one terminal of the winding 42 of the contactor 40, one terminal of the winding 33 of the electroresponsive contactor 28, and one terminal of the winding 22 of the contactor 20. The other terminal of each of these windings is connected to ground.

The contact element 49 is connected by way of a wire 65 to the wire 52 leading to the contact element 47.

The movable contacts 55 and 60 associated with the uncoupling valve device 2 are arranged so that in the normal or coupling position of this valve device, they engage the stationary contacts associated therewith, while in the uncoupling position of this valve device they are out of engagement with the stationary contacts associated therewith so as to interrupt the circuits controlled thereby.

The contact element 146 of the electric portion 145 of the coupler 101 is connected by way of the wire 150 to the portion of the control supply bus 130 on the car on which the coupler 101 is mounted.

The contact element 147 is connected by way of a wire 152 with a stationary contact 154, which is adapted to be engaged by a movable contact 155 which is also adapted to engage a stationary contact 156, which is connected by way of a wire 157 to one terminal of the winding 134 of the electroresponsive contactor 128.

The contact element 148 is connected by way of a wire 158 to a stationary contact 159 which is adapted to be engaged by a movable contact 160, which is also adapted to engage a stationary contact 162 which is connected by way of a wire 163 to one terminal of the winding 122 of the contactor 120, one terminal of the winding 133 of the electroresponsive contactor 128, and one terminal of the winding 142 of the contactor 140.

The contact element 149 is connected by way of a wire 165 with the wire 152 which is connected to the contact element 147.

The movable contacts 155 and 160 are associated with the uncoupling valve device 102 for the coupler 101, and are arranged so that in the normal or coupling position of this valve device they engage the stationary contacts associated therewith to establish circuits therebetween, while in the uncoupling position of the uncoupling valve device these movable contacts do not engage the stationary contacts and thus interrupt the circuits through wires connected to the stationary contacts.

The equipment on each end of a motor or auxiliary car is substantially the same as the equipment on the other end of the same car. In the diagram shown in Fig. 2 of the drawings, the train comprising motor cars M1 and M2, and the trailer car T1 is assumed to be traveling from left to right, as viewed in this figure of the drawings, and the reference numerals for the equipment at the right or forward ends of the cars is followed by the suffix $f$, while the reference numerals for the equipment at the left or rear ends of the cars is followed by the suffix $r$.

Referring to Fig. 2 of the drawings, each of the motor cars is provided with a dynamotor 70 which is driven by current supplied from the trolley 16 on this car. One terminal of each of the dynamotors is grounded, while the other terminal is adapted to be connected by a switch 72 with the portion of the control supply bus 30 on the motor car, and is also adapted to be connected by means of a switch 73 to the portion of the light supply bus 36 on the motor car.

When the cars are coupled together into a train as shown in Fig. 2 of the drawings, the dynamotor 70 on the car adjacent one end of the train is connected to the light supply bus 36, while the dynamotor on the motor car adjacent the other end of the train is connected to the control supply bus 30. This distributes the load on the dynamotors on the motor cars as one dynamotor supplies the current required for the lights, while the other supplies the current required for control purposes.

Each of the motor cars is provided with electrical heating means indicated at 75 which is adapted to be connected to or disconnected from the trolley 16 by means of a suitable switch, not shown, interposed in the wire 74.

In addition, each of the motor cars is provided with electric lights indicated at 78, one terminal which is grounded and the other terminal of which is adapted to be connected to the light wire 36 by a suitable switch, not shown.

The trailer car T1 is provided with electrical heating means in the form of a resistance heating unit indicated at 175. This unit is connected by way of a wire 174 with a switch blade 176 which is movable between a position in which it engages a contact 177f and a position in which it engages a contact 177r. The contact 177f is connected by way of the wire 115f with the contacts carried by the coupler on the forward end of the car, while the contact 177r is connected by way of the wire 115r with the contacts carried by the coupler at the rear of the car.

The trailer car T1 is provided with lights 178, one terminal which is connected to ground, and the other terminal of which is adapted to be connected by means of a switch, not shown, with the portion of the light wire 136 on the trailer car.

The diagram illustrated in Fig. 2 of the drawings shows the circuit connections which are established in a train which includes a trailer car and two motor cars. At this time the contacts carried by the couplers on the trailer car, by the coupler at the rear of the motor car M1, and by the coupler at the front of the motor car M2 engage with the result that the control supply and light supply bus wires on the various cars are connected together after magnetic contactors have been closed in a manner to be described. In addition, the contact 177f associated with the switch for the heater unit 175 on the trailer car T1 is connected through the contacts 105f and 110f to the wire 15r on the motor car M1, which is connected to the trolley 16 on that car.

Similarly the contact 177r on the trailer car T1 is connected through the contacts 110r and 105r to the wire 15f on the motor car M2, which is connected to the trolley 16 on that car.

The switch blade 176 is arranged so that it will engage either of the contacts 177r and 177f and thereby connect the heating unit 175 on the trailer car to the trolley on either of the motor cars. The switch blade 176 is also arranged so that they will not engage both of these contacts at the same time with the result that no circuit can be established between the trolleys on the motor cars through the heating circuit on the trailer car.

At this time the uncoupling valve devices associated with the couplers on the trailer car, with the coupler at the rear of motor car M1, and with the coupler at the front of the motor car M2 are in their normal positions and thus permit the contact carrying slides of the electric portions of the couplers to be projected into engagement with each other so that the contact elements carried thereby engage.

As the couplers are coupled together, the contacts carried thereby engage, while the contacting elements of the electric portions of the connected couplers also engage. Accordingly current supplied to the control supply bus 30 on the motor car M2 flows by way of the wire 59f to the contact element 46f and thence to the contact 149r which is engaged by the contact element 46f at this time. Current supplied to the contact element 149r flows therefrom by way of the wire 165r and the wire 152r to the contact element 147r which is engaged at this time by the contact element 48f. Current supplied to the contact element 48f flows therefrom by way of the wire 58f and through the movable contact 60f of the uncoupling valve device 2f, which is in the normal or coupling position at this time, to the wire 63f from which current is supplied to the winding 42f of the contactor 40f, the winding 33f of the electroresponsive contactor 28f, and the winding 22f of the contactor 20f.

As the result of the supply of current to the windings of the contactors associated with the coupler at the forward end of the motor car M2, the movable contacts of these contactors are maintained in their closed positions to complete the circuits controlled thereby.

In addition, current supplied to the wire 165r flows therefrom through the movable contact 155r associated with the uncoupling valve device 102r for the coupler at the rear of the trailer car T1, and thence by way of the wire 157r to the winding 134r of the electroresponsive contactor 128r. As a result of energization of the winding 134r the movable contact 131r is held in the closed position to establish a circuit between the wire 124r leading from the contacts 111r and 106r, and the portion of the control supply bus 130 on the trailer car T1. Current from the control supply bus 130 flows therefrom through the wire 150r and the contact elements 146r and 49f to the wire 65f, from which it flows by way of the wire 52f, movable contact 55f, and wire 57f to the winding 34f of the electroresponsive contactor 28f.

In addition, current supplied to the wire 52f flows in the other direction through the contact elements 47f and 148r to the wire 158r, and thence through the movable contact 160r to the wire 163r, from which it flows to the windings 122r, 133r and 142r of the contactors associated with the coupler at the rear of the trailer car T1 to maintain the movable contacts thereof in their closed positions.

As the movable contacts of the electroresponsive contactors associated with the couplers on both the motor and trailer cars are in their closed positions, circuits are maintained through the contacts carried by the couplers.

As the coupler at the front of the trailer car T1 and the coupler at the rear of the motor car M1 are coupled together, substantially the same circuit conditions will be present in the circuits associated with these couplers as have been described in detail in connection with the couplers at the front of the motor car M2 and at the rear of the trailer car T1.

The couplers at the front of the motor car M1 and at the rear of the motor car M2 are not connected to other couplers at this time and the bus contacts carried by these couplers are therefore exposed. The couplers are constructed so that when they are not coupled to other couplers the contact carrying slides are retracted, while doors are held in position to cover the contact elements of the contact carrying slides to prevent them from being reached. Even though the contact elements therein are energized, therefore, there is no danger of injury to workmen or others as the contact elements cannot be touched because of the presence of the doors. The bus contacts, however, are exposed, as pointed out above.

It will be seen also that the windings of the magnetic contactors associated with the circuits through the contacts on the couplers on these ends of the motor cars M1 and M2 are not connected to any source of current as the contact elements in the electric portions of the couplers are not engaged by other contact elements at this time. As a result, therefore, the movable contacts of the contactors will be maintained in their open positions and no current will be supplied to the contacts on these couplers at this time. This prevents injury to workmen or others who might touch the exposed contacts.

When the cars are to be uncoupled, the control system provided by this invention operates to cause the magnetic contactors associated with the couplers which are to be separated to be opened before the couplers are released so that the circuits leading to the contacts associated with the couplers are interrupted before the contacts are separated. This prevents arcing and burning and consequent damage to the contacts.

In order to uncouple the couplers after they are coupled together, the uncoupling valve device associated with either of the couplers to be uncoupled is turned from the normal position to the uncoupling position in which fluid under pressure is supplied to the mechanism in the couplers to first retract the contact carrying slides of the couplers, and to thereafter release the couplers.

For purposes of illustration it will be assumed that it is desired to uncouple the motor car M1 from the trailer car T1 in the train shown in Fig. 2 of the drawings, and that the uncoupling valve device 2r associated with the coupler at the rear of the motor car M1 is turned to the uncoupling position.

As soon as the uncoupling valve device 2r is turned from the normal or coupling position to the uncoupling position, the movable contacts 55r and 60r associated therewith are moved out of engagement with the stationary contacts engaged by the movable contacts, while fluid under pressure is supplied to the couplers to retract the contact carrying slides in the couplers.

When the movable contact 55r is moved away from the stationary contacts engaged thereby the circuit through the winding 34r of the electroresponsive contactor 28r is interrupted, and at the same time, the movable contact 60r is moved out of engagement with the stationary contacts engaged thereby and interrupts the circuits through the windings 22r, 33r and 42r of the contactors associated with the coupler at the rear of the motor car M1. These contactors will thereupon be operated to open the circuits controlled thereby with the result that the contacts carried by the coupler at the rear of the motor car M1 will be deenergized before the couplers are separated.

On the supply of fluid under pressure to the mechanism in the couplers the slide retracting mechanisms are operated to move the movable contact carrying slides away from each other, thereby moving the contact elements out of engagement. As soon as these contact elements are moved out of engagement the supply of current to the windings of the contactors associated with the coupler at the forward end of the trailer car T1 will be cut off, and these contactors will be operated to open the circuits through the contacts carried by the coupler at the forward end of the trailer car T1.

As soon as the cars are separated the uncoupling valve device 2r associated with the coupler at the rear of the motor car M1 is returned to the normal or coupling position to cut off the supply of fluid under pressure to the mechanism in the couplers, while the movable contacts 55r and 60r again engage the stationary contacts associated therewith.

At this time, as the couplers are not connected to other couplers, the slide retracting mechanisms will be operated to maintain the contact carrying slides in their retracted positions, while doors will be held over the faces of the contacting elements of the slides. As the contacting elements in the contact carrying slides do not engage other contacting elements no current will be supplied to the windings of the contactors controlling the circuits through the bus contacts carried by these couplers and these contacts, therefore, will be maintained deenergized, which is desirable as they are exposed at this time.

Substantially the same sequence of operation will take place if the uncoupling valve device 102f associated with the coupler at the forward end of the trailer car T1 is employed to release the couplers, instead of the uncoupling valve device 2r associated with the coupler at the rear of the motor car M1.

When the uncoupling valve device 102f associated with the coupler at the forward end of the trailer car T1 is turned from the normal or coupling position to the uncoupling position, fluid under pressure is supplied to the mechanism in the couplers to cause the contact carrying slides to be retracted, and to thereafter cause the couplers to be released so that the cars may be parted.

In addition, on movement of this uncoupling valve device 102f to the uncoupling position, the movable contacts 155f and 160f are moved out of engagement of the stationary contacts associated therewith so as to interrupt the circuits through all of the windings of the contactors associated with the coupler at the front of the trailer car and controlling the circuits through the contacts carried by the coupler at this end of the trailer car T1, and these contactors are thereupon operated to interrupt these circuits.

In addition, on operation of the electroresponsive contactor 128f on the trailer car T1 to interrupt the control bus circuit, the supply of current from the dynamotor 70 on the motor car M2 to the portion of the control bus 30 on the motor car M1 is cut off, and, as a result, the winding 22r of the contactor 20r, the winding 33r of the electroresponsive contactor 28r, and the winding 42r of the contactor 40r are deenergized as these windings are supplied with current from the portion of the control bus wire on the motor car M1. The movable contacts 21r and 41r of the contactors 20r and 40r, respectively, will thereupon be operated to interrupt the bus circuits controlled thereby. At this time, however, the movable contact 31r of the electroresponsive contactor 28r will be maintained in the closed position by the winding 34r, which continues to be supplied with current from the portion of the control bus wire 130 on the trailer car T1 until the contact carrying slides of the electric portions of the couplers are retracted. When the contact carrying slides are moved apart, the contact elements carried thereby are separated and the supply of current from the control bus circuit 130 on the trailer car T1 to the winding 34r of the contactor 28r is interrupted, and the movable contact 31r is then moved to the open position to open the circuit controlled thereby.

It will be seen, therefore, that the contactors associated with each of the couplers will be operated to interrupt the circuits controlled thereby on movement of the uncoupling valve device associated with either of the couplers to the uncoupling position. If any of the contactor windings are not deenergized directly by operation of the movable contacts associated with the uncoupling valve device, they will be deenergized when the contact carrying slides are separated, which occurs before the couplers are released, and hence the bus contacts carried by the couplers will be deenergized before the couplers are released, and hence will be deenergized at the time the couplers are separated.

After separation of the cars the uncoupling valve device 102f associated with the coupler at the forward end of the trailer car T1 is returned to the normal position, thereby moving the movable contacts 155f and 160f into engagement with the stationary contacts associated therewith, but the circuits through these contacts will not be effective to supply current to any of the windings of the contactors associated with this coupler as the contact carrying slide of the electric portion of the coupler is in the retracted position and the contact elements thereof are not connected to any source of current.

The coupling system provided by this invention operates when the cars are being coupled to maintain the bus contacts associated with the couplers deenergized until the couplers are substantially fully coupled together and the contacts carried thereby are firmly engaged, and to thereafter automatically complete the circuits through these contacts.

For purposes of illustration it will be assumed that the motor car M1 is disconnected from the trailer car T1, and that it is desired to couple these cars together. In order to couple these cars together it is necessary only to move them together, thus causing the bus contacts carried by the couplers to engage, and the mechanism in the couplers then operates automatically to couple the cars, and to thereafter release the contact carrying slides so that the springs associated with the slides will project them outwardly and cause the contact elements carried thereby to engage.

At this time the uncoupling valve devices associated with the couplers remain in their normal or coupling positions so that the movable contacts associated therewith engage the stationary contacts to complete the circuits controlled thereby.

Assuming that the dynamotor 70 of the motor car M2 is connected to the portion of the control bus circuit on this car, as shown in Fig. 2 of the drawings, and supplies current thereto, then the portion of the control bus circuit 130 on the trailer car T1 will be energized, and upon engagement of the contacting elements 146f and 49r associated with the couplers on the trailer and motor cars, respectively, current from the portion 130 on the control bus wire on the trailer car T1 will flow to the wire 65r on the motor car M1, from which it will flow by way of the wire 52r to the contact element 47r, contact element 148f, and wire 158f to the movable contact 160f. From the movable contact 160f current will flow by way of the wire 163f to the winding 122f of the contactor 120f, the winding 133f of the electroresponsive contactor 128f, and to the winding 142f of the contactor 140f. Upon the supply of current to these windings, the movable contacts of these contactors will be moved to their closed positions and upon movement of the movable contact 131f of the electroresponsive contactor 128f to the closed position, current from the portion 130 of the control bus wire on the trailer car T1 will flow to the wire 124f and the branch wire 125f, and through the contacts 106f and 111f to the contacts 6r and 11r carried by the coupler at the rear of the motor car M1. Current supplied to the contacts 6r and 11r flows therefrom by way of the wires 24r and 25r to the wire 24r at the rear of the motor car M1.

Upon movement of the contact elements 146f and 49r into engagement with each other current from the portion 130 of the control bus wire on the trailer car T1 supplied by way of the wire 159f to the wire 65r on the motor car also flows therefrom by way of the wire 52r, the movable contact 55r and the wire 57r to the winding 34r of the electroresponsive contactor 28r, and upon energization this winding causes the movable contact 31r to be moved to the closed position and establish a circuit between the wire 24r and the portion of the control bus wire 30 on the motor car M1.

On the supply of current to the portion of the control bus 30 on the motor car M1, current flows therefrom by way of the wire 50r, the contact elements 46r and 149f to the wire 165f associated with the coupler at the forward end of the trailer car T1. Current supplied to the wire 165f flows therefrom by way of the wire 152f, the contact elements 147f and 48r to the wire 58r, and then through the movable contact 60r of the uncoupling valve device 2r associated with the coupler on the rear end of the motor car M1 to the wire 63r, from which current is supplied to the winding 42r of the contactor 40r, the winding 33r of the electroresponsive contactor 28r, and the winding 22r of the contactor 20r.

As the movable contact 31r of the electroresponsive contact 28r has already been moved to the closed position as the result of energization of the winding 33r, the supply of current to the winding 34r is without effect.

On the supply of current to the windings of the contactors 20r and 40r, the movable contacts 21r and 41r thereof, respectively, are moved to their closed positions to complete the circuits controlled thereby.

Because of the use of double windings on the electroresponsive contactors controlling the control circuit, these contactors will be operated to close the circuits controlled thereby when the couplers are coupled together regardless of the point at which current is supplied to the control bus circuit.

Thus it will be seen that the winding 34r associated with the movable contact 31r of the electroresponsive contactor 28r associated with the coupler at the rear end of the motor car M1 is supplied with current from the portion of the control bus circuit 130 on the trailer car T1 on movement of the contact carrying slides of the electric portions of the couplers into engagement with each other. The energization of this winding causes the movable contact of the contactor 28r to move to the position to complete the circuit through the control bus wire from the motor car M2 and supplies current to the portion of the control bus wire on the motor car M1 remote from the dynamotor 70 on the motor car M2. Upon the supply of current to this portion of the control bus wire on the motor car M1, current is supplied to the other of the windings of this electroresponsive contactor.

If the control bus circuit in the train were energized from the dynamotor 70 on the motor car M1 instead of by the dynamotor 70 on the motor car M2, the electroresponsive contactors controlling the control bus circuit will be operated to complete this circuit even through the point at which current is supplied to the control bus circuit from which current is supplied to operate the contactors is changed.

Under the conditions just described, upon movement of the contact elements of the contact carrying slides into engagement with each other, current from the portion of the control bus 30 on the motor car M1 will flow therefrom by way of the wire 50r and through the contacting elements 46r and 149f to the wire 165f, and thence by way of the wire 152f, contact elements 147f and 48r to the wire 58r, from which current flows through the movable contact 60r of the uncoupling valve device 2r to the wire 63r by which current is supplied to the winding 33r of the electroresponsive contactor 28r to move the movable contact 31r to the closed position to supply current from the portion of the control bus 30 on the motor car M1 to the bus contacts 9r and 11r carried by the coupler at the rear of this car.

In addition, current supplied to the wire 165f on the trailer car T1 flows therefrom by way of the wire 152f and through the movable contact 155f of the uncoupling valve device 102f associated with the coupler at the front of the trailer car to the winding 134f of the electroresponsive contactor 128f associated with the coupler on the trailer car, and causes the movable contact of this contactor to be moved to the closed position to establish a circuit between the wire 124f leading from the contacts 106f and 111f carried by the coupler to the portion of the control bus 130 on this car.

On the supply of current to the portion of the control bus 130 on the trailer car, current will be supplied to the others of the windings of the electroresponsive contactors on the trailer car and motor car controlling the control circuit, and also to the windings of the contactors 120f and 140f associated with the coupler at the forward end of the trailer car.

It will be seen that when two cars are coupled together, one of the windings of each of the contactors associated with the control supply bus on each of the cars is supplied with current from the portion of the control supply bus on the car with which the contactor is associated, while the other of the windings of this contactor is supplied with current from the portion of the control supply bus on the connected car.

If the control supply bus is supplied with current from one end of the train, the portion of the control supply bus on one of the cars will be energized before the cars are coupled together, while the portion of the control supply bus on the other car will not be energized before the cars are coupled together. If the control supply bus is energized from the other end of the train, the condition of the control supply buses on the cars before the cars are coupled together will be reversed.

In any event, however, the contactors controlling the control supply bus will be operated to complete this circuit when the cars are coupled together as the windings of each of these contactors are supplied with current from the portions of the control supply bus on both of the cars being coupled together.

It will be seen also that the circuits through which current is supplied from the control supply bus to the windings of the contactors controlling the control supply bus are arranged so that circuits will not be established between the different sections of the control supply bus through these windings.

While one embodiment of the improved coupling and circuit control system provided by my invention has been illustrated and described in detail, it is to be understood that the invention is not limited to these details of construction, and that numerous changes and modifications may be made without departing from the scope of the following claims.

Having now described my invention, what I claim as new and desire to secure by Letters Patent, is:

1. In a circuit control system for use on cars of a type having a control circuit thereon which when the cars are coupled into a train may be energized from one end of the train at one time and from the other end of the train at another time, the cars being equipped at each end with car couplers of a type having an electric portion having contact elements which engage each other when and only when two couplers are brought substantially into the coupled relationship, the control system comprising contacts associated with each of the couplers and adapted to engage the corresponding contact associated with a coupler connected thereto, said contacts being adapted to engage before the couplers are fully coupled together, each of said couplers having associated therewith an electroresponsive device operated on the supply of current to establish a circuit between the control circuit on the car with which the coupler is associated and the contact associated with such coupler, and means controlled by said contact elements and operative when the contact elements on two couplers engage for establishing circuits to each of the electroresponsive devices associated with each of two connected cars from the control circuit on the other of the said cars.

2. In a car coupling system, in combination, car couplers which may be coupled together and carrying contacts which when the couplers are coupled together engage before the couplers are fully coupled to establish a circuit which may be energized at one end at one time and at the other end at another time, each of said couplers having an electroresponsive device associated therewith and operative on the supply of current thereto to establish the circuit through the contact on said coupler, the couplers each having an electric portion having contact elements which engage corresponding contact elements on the other coupler when and only when two couplers are brought substantially into the coupled relationship, and means controlled by the contact elements of said electric portion and operative when the contact elements on two couplers engage for establishing circuits from the control circuit on each of the coupled cars to the electroresponsive devices associated with each of the couplers.

3. In a circuit control system for use on cars of a type having a control circuit thereon which when the cars are coupled into a train may be energized from one end of the train at one time and from the other end of the train at another time, the cars being equipped at each end with car couplers of a type having an electric portion having contact elements which engage corresponding contact elements on the other coupler when and only when two couplers are brought substantially into the coupled relationship, the control system comprising contacts associated with each of the couplers and adapted to engage the corresponding contact associated with a coupler connected thereto, said contacts being adapted to engage before the couplers are fully coupled together, each of said couplers having associated therewith an electroresponsive device operated on the supply of current to establish a circuit between the control circuit on the car with which said coupler is associated and the contact associated with such coupler, and means controlled by said contact elements and operative when the contact elements on two couplers engage for supplying current to each of the electroresponsive devices associated with each of two connected cars from the control circuit on the other of the said cars, each of said couplers having an uncoupling device associated therewith and movable between a coupling and an uncoupling position, each of said uncoupling devices having means associated therewith for controlling the supply of current to the electroresponsive device associated with the car on which the uncoupling device is mounted.

4. In a circuit control system for use on cars of a type having a control circuit thereon which when the cars are coupled into a train may be energized from one end of the train at one time and from the other end of the train at another time, the cars being equipped at each end with car couplers of a type having an electric portion having contact elements which engage corresponding contact elements on the other coupler when and only when two couplers are brought substantially into the coupled relationship, the control system comprising contacts associated with each of the couplers and adapted to engage the corresponding contact associated with a coupler connected thereto, said contacts being adapted to engage before the couplers are fully coupled together, each of said couplers having associated therewith an electroresponsive device operated on the supply of current to establish a circuit between the control circuit on the car with which the coupler is associated and the contact associated with such coupler, and means controlled by said contact elements and operative when the contact elements on two couplers engage for supplying current to each of the electroresponsive devices associated with each of two connected cars from the control circuit on the other of the said cars, each of said couplers having an uncoupling device associated therewith and movable between a coupling and an uncoupling position, each of said uncoupling devices having means associated therewith for controlling the supply of current to the electroresponsive device associated with the car on which the uncoupling device is mounted, and also controlling the supply of current to the electroresponsive device associated with the connected car.

5. A circuit control system for use on cars of a type having a control circuit thereon which when the cars are coupled into a train may be energized from one end of a train at one time and from the other end of the train at another time, the cars being provided with car couplers of a type having an electric portion having contact elements which engage corresponding contact elements on the other coupler when and only when two couplers are brought substantially into the coupled relationship, the control system comprising contacts associated with the couplers and adapted to engage the corresponding contact associated with a coupler connected thereto, said contacts being adapted to engage before the couplers are fully coupled together, each of said couplers having an electroresponsive device associated therewith, each of said electroresponsive devices having a plurality of windings and being operative on the supply of current to any one of said windings to establish a circuit between the control circuit on the car with which the electroresponsive device is associated and the contact associated with the coupler on said car, and means controlled by said contact elements and operative when the contact elements on two couplers engage for supplying current to one of the windings of each of said electroresponsive devices associated with the coupled couplers from the control circuit on the car with which the electroresponsive device is associated, and for supplying current to another of the windings of each of said electroresponsive devices from the control circuit on the connected car.

6. In a circuit control system for use on cars of a type having a control circuit thereon which when the cars are coupled into a train may be energized from one end of the train at one time and from the other end of the train at another time, the cars being equipped with car couplers of a type having an electric portion having contact elements which engage corresponding contact elements on the other coupler when and only when two couplers are brought substantially into the coupled relationship, the control system comprising contacts associated with the couplers and adapted to engage the corresponding contact associated with a coupler connected thereto, said contacts being adapted to engage before the couplers are fully coupled together, each of said couplers having an electroresponsive device associated therewith and operative on the supply of current to establish a circuit between the control circuit on the car with which the electroresponsive device is associated and the contact associated with the coupler on said car, and means controlled by said contact elements and operative when the contact elements on two couplers engage for supplying current to each of the electroresponsive devices associated with each of the connected cars from the control circuit on the other of said cars, each of said couplers having another contact associated therewith and engaging a corresponding contact on a connected coupler when the couplers are connected together, said contacts each having an electroresponsive contactor associated therewith and controlling the circuit therethrough, and means controlled by said contact elements for supplying current to the windings of said contactors.

7. In a circuit control system for use on cars of a type having a control circuit thereon which when the cars are coupled into a train may be energized from one end of the train at one time and from the other end of the train at another time, the cars being equipped with car couplers of a type having an electric portion having contact elements which engage corresponding contact elements on the other coupler when and only when two couplers are brought substantially into the coupled relationship, the control system comprising contacts associated with the couplers and adapted to engage the corresponding contact associated with a coupler connected thereto, said contacts being adapted to engage before the couplers are fully coupled together, each of said couplers having an electroresponsive device associated therewith and operative on the supply of current to establish a circuit between the control circuit on the car with which the electroresponsive device is associated and the contact associated with the coupler on said car, and means controlled by said contact elements and operative when the contact elements on two couplers engage for supplying current to each of the electroresponsive devices associated with each of the connected cars from the control circuit on the other of said cars, each of said couplers having another contact associated therewith and engaging a corresponding contact on a connected coupler when the couplers are connected together, said contacts having electroresponsive contactors associated therewith and controlling the circuits therethrough, and means controlled by said contact elements for supplying current to the winding of each of said contactors from the portion of the control circuit on the car with which the contactor is associated.

8. In a train current supply system, a supply line having a section on each car of the train, each car having at each end a contact for electrically connecting the section of the line on said car with the section of the line on an adjacent car, each car having at each end electroresponsive means for normally disconnecting the section of the line on said car from the contact at said end of the car, said electroresponsive means being operated on the supply of current thereto to establish connection between the section of the line on the car and the contact, said car carrying means other than said supply line contact for supplying current from the section of the supply line on one car to the electroresponsive means on the end of the adjacent car.

9. In a train current supply system, a supply line having a section on each car of the train, each car having at each end a contact for electrically connecting the section of the supply line on said car with the section of the supply line on an adjacent car, each car having at each end electroresponsive means for normally disconnecting the section of the supply line on said car from the contact at said end of the car, said electroresponsive means being operated on the supply of current thereto to establish connection between the section of the supply line on the car and the contact, said cars having at each end a contact separate from the supply line contact and operable when the end of each car is coupled to another car to cooperate with the corresponding contact on the coupled car to establish a circuit from the section of the supply line on the car to the electroresponsive means at the end of the adjacent car.

10. In a train current supply system, a supply line having a section on each car of the train, each car having at each end a contact for electrically connecting the section of the supply line on said car with the section of the supply line on an adjacent car, each car having at each end electroresponsive means for normally disconnecting the section of the supply line on said car from the contact at said end of the car, said electroresponsive means being operated on the supply of current thereto to establish connection between the section of the supply line on the car and the contact, said cars each having at each end contacts separate from the supply line contacts, said other contacts at the coupled ends of the adjacent cars engaging when the cars are coupled together to establish a circuit from the section of the supply line on a car to the electroresponsive means on the said car.

11. In a train current supply system, a supply line having a section on each car of the train, each car having at each end a contact for electrically connecting the section of the supply line on said car with the section of the supply line on an adjacent car, each car having at each end electroresponsive means for normally disconnecting the section of the supply line on said car from the contact at said end of the car, said electroresponsive means being operated on the supply of current thereto to establish connection between the section of the supply line on the car and the contact, said cars each having at each end contacts separate from the supply line contacts, said last named contacts at the coupled ends of the adjacent cars engaging when the cars are coupled together to establish a circuit from the section of the supply line on the car to an electroresponsive means on the said car, the circuit to the electroresponsive means at the end of each of the cars including a portion carried by the adjacent car.

12. In a train current supply system, a supply line having a section on each car of a train, each car having at each end a car coupler, each coupler having associated therewith a contact for electrically connecting the section of the supply line on the car with the section of the supply line on the adjacent car, each car having at each end an electroresponsive device for normally disconnecting the section of the supply line on the car from the contact associated with the coupler at said end of the car, said electroresponsive device being operative on the supply of current thereto to establish connection between the section of the supply line on the car and the said contact, each of said couplers having associated therewith another contact separate from the supply line contact and which when the coupler is coupled to another engages with the corresponding contact on the connected coupler to establish a circuit through which current may be supplied from the section of the supply line on one car to the electroresponsive device on the adjacent car.

13. In a train current supply system, a supply line having a section on each car of a train, each car having at each end a car coupler, each coupler having associated therewith a contact for electrically connecting the section of the supply line on the car with the section of the supply line on the adjacent car, each car having at each end an electroresponsive device for normally disconnecting the section of the line on the car from the contact associated with the coupler at said end of the car, said electroresponsive device being operative on the supply of current thereto to establish connection between the section of the supply line on the car and the said contact, each of said couplers having associated therewith another contact separate from the supply line contact and which when the coupler is coupled to another engages with the corresponding contact on the connected coupler to establish a circuit through which current may be supplied from the section of the supply line on one car to the electroresponsive device on the adjacent car, each of said couplers also having associated therewith another contact separate from the aforementioned contacts and which when the coupler is coupled to another cooperates with the corresponding contact on the other coupler to establish a circuit through which current may be supplied from the section of the supply line on a car to the electroresponsive device on the said car.

14. In a train current supply system, a supply line having a section on each car of a train, each car having at each end a car coupler, each coupler having associated therewith a contact for electrically connecting the section of the supply line on the car with the section of the supply line on the adjacent car, each car having at each end an electroresponsive device for normally disconnecting the section of the line on the car from the contact associated with the coupler at said end of the car, said electroresponsive device being operative on the supply of current thereto to establish connection between the section of the line on the car and the said contact, each of said couplers having associated therewith another contact separate from the aforementioned contacts and which when the coupler is coupled to another cooperates with the corresponding contact on the other coupler to establish a circuit from the section of the line on a car to the electroresponsive device on the said car.

JOHN W. LOGAN, Jr.